No. 641,834. Patented Jan. 23, 1900.
J. H. BULLARD.
COMBINED DRIVING AND STEERING AXLE FOR AUTOMOBILE VEHICLES.
(Application filed Apr. 11, 1899.)
(No Model.) 4 Sheets—Sheet 1.

Witnesses:
Inventor:
James H Bullard
by Chapin & Co
Attorneys

No. 641,834. Patented Jan. 23, 1900.
J. H. BULLARD.
COMBINED DRIVING AND STEERING AXLE FOR AUTOMOBILE VEHICLES.
(Application filed Apr. 11, 1899.)
(No Model.) 4 Sheets—Sheet 3.

Witnesses:
J. D. Garfield
N. I. Clemons

Inventor,
James H. Bullard
by Chapin Lee
Attorneys.

No. 641,834. Patented Jan. 23, 1900.
J. H. BULLARD.
COMBINED DRIVING AND STEERING AXLE FOR AUTOMOBILE VEHICLES.
(Application filed Apr. 11, 1899.)
(No Model.) 4 Sheets—Sheet 4.
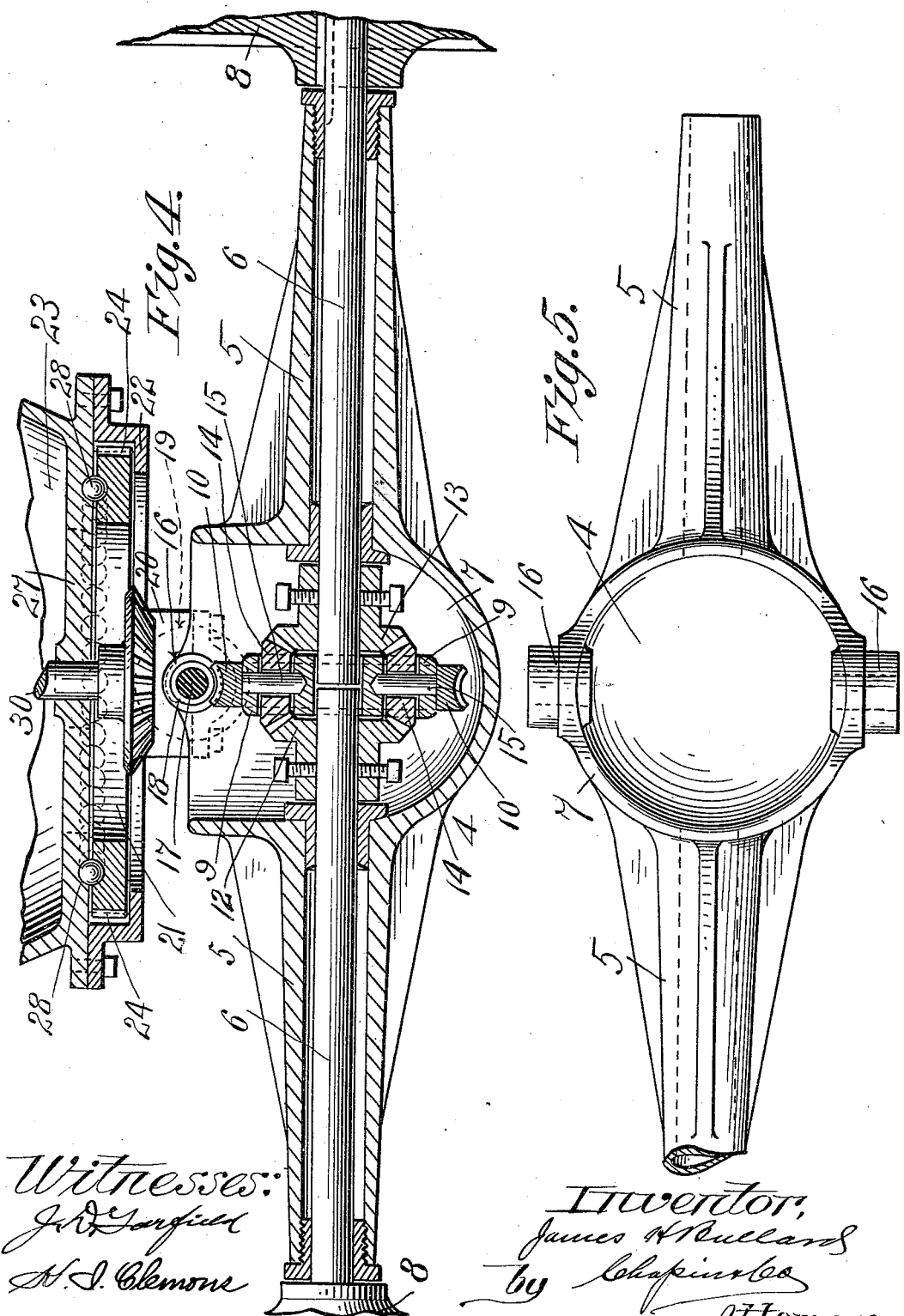
Witnesses:
Inventor,
James H Bullard
by Chapin & Co
Attorneys

UNITED STATES PATENT OFFICE.

JAMES H. BULLARD, OF SPRINGFIELD, MASSACHUSETTS.

COMBINED DRIVING AND STEERING AXLE FOR AUTOMOBILE VEHICLES.

SPECIFICATION forming part of Letters Patent No. 641,834, dated January 23, 1900.

Application filed April 11, 1899. Serial No. 712,636. (No model.)

*To all whom it may concern:*

Be it known that I, JAMES H. BULLARD, a citizen of the United States of America, residing at Springfield, in the county of Hampden and State of Massachusetts, have invented new and useful Improvements in a Combined Driving and Steering Axle for Automobile Vehicles, of which the following is a specification.

This invention relates to automobile vehicles, and particularly to truck-wagons adapted to carry heavy loads, and has for its object the construction of a vehicle of this kind in which the motive force shall be applied directly to the front axle of the vehicle, and which axle shall also constitute the steering-axle, whereby the driver may more conveniently handle the vehicle in crowded thoroughfares and in the restricted spaces into which such a vehicle must frequently be taken.

Another and important object of the invention consists in the construction of the said front axle of the vehicle whereby the extremities thereof may have oscillatory movements in a vertical plane at whatever angle the axle may be located relative to a longitudinal center line drawn through the wagon and in the construction and arrangement of the driving means whereby rotary movements will, whatever may be the position of the axle, be imparted to said axle for moving the wagon.

The invention consists in the construction and arrangement of the devices, as fully hereinafter described, and pointed out in the claims.

Figure 1:
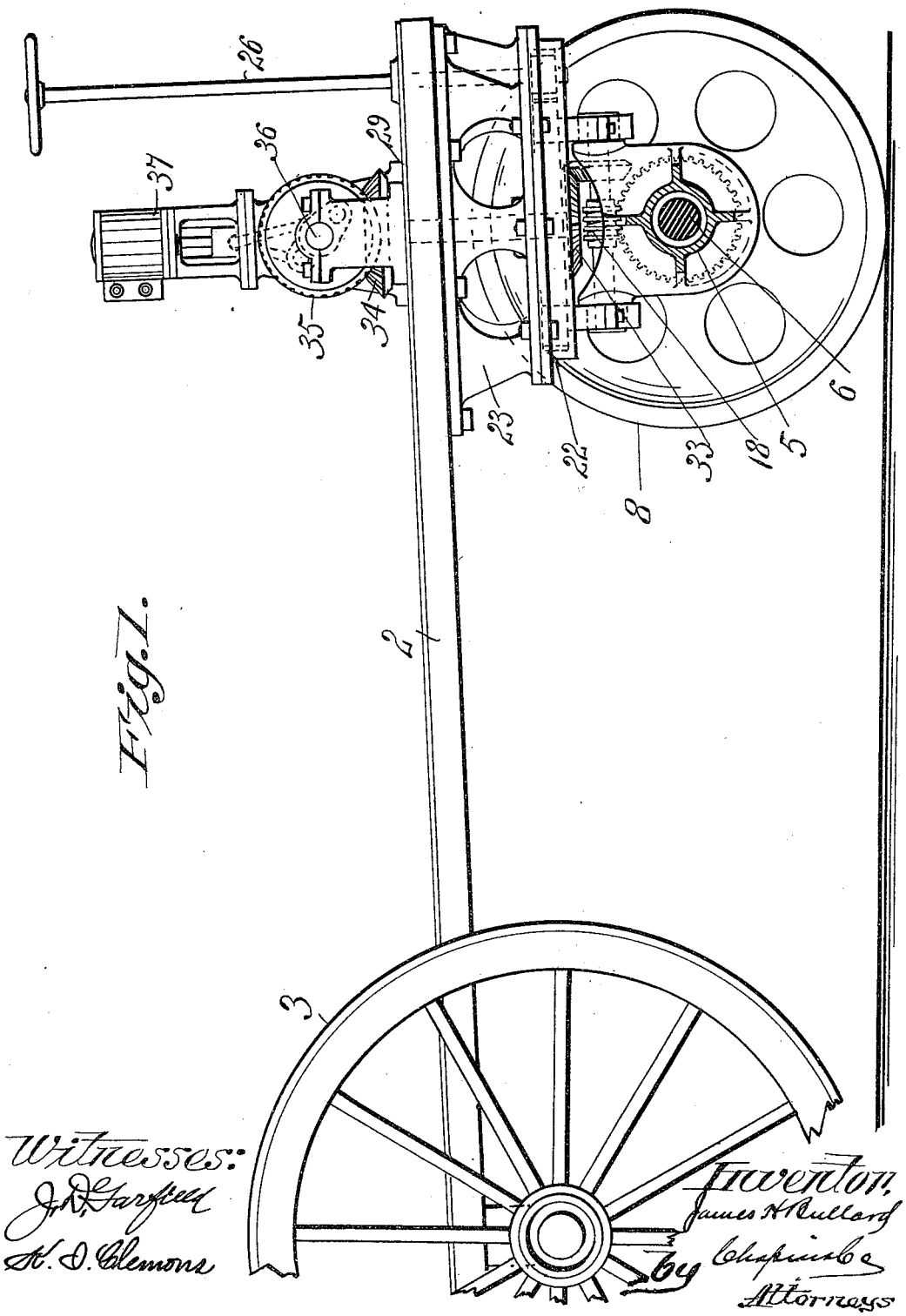
Figure 2:
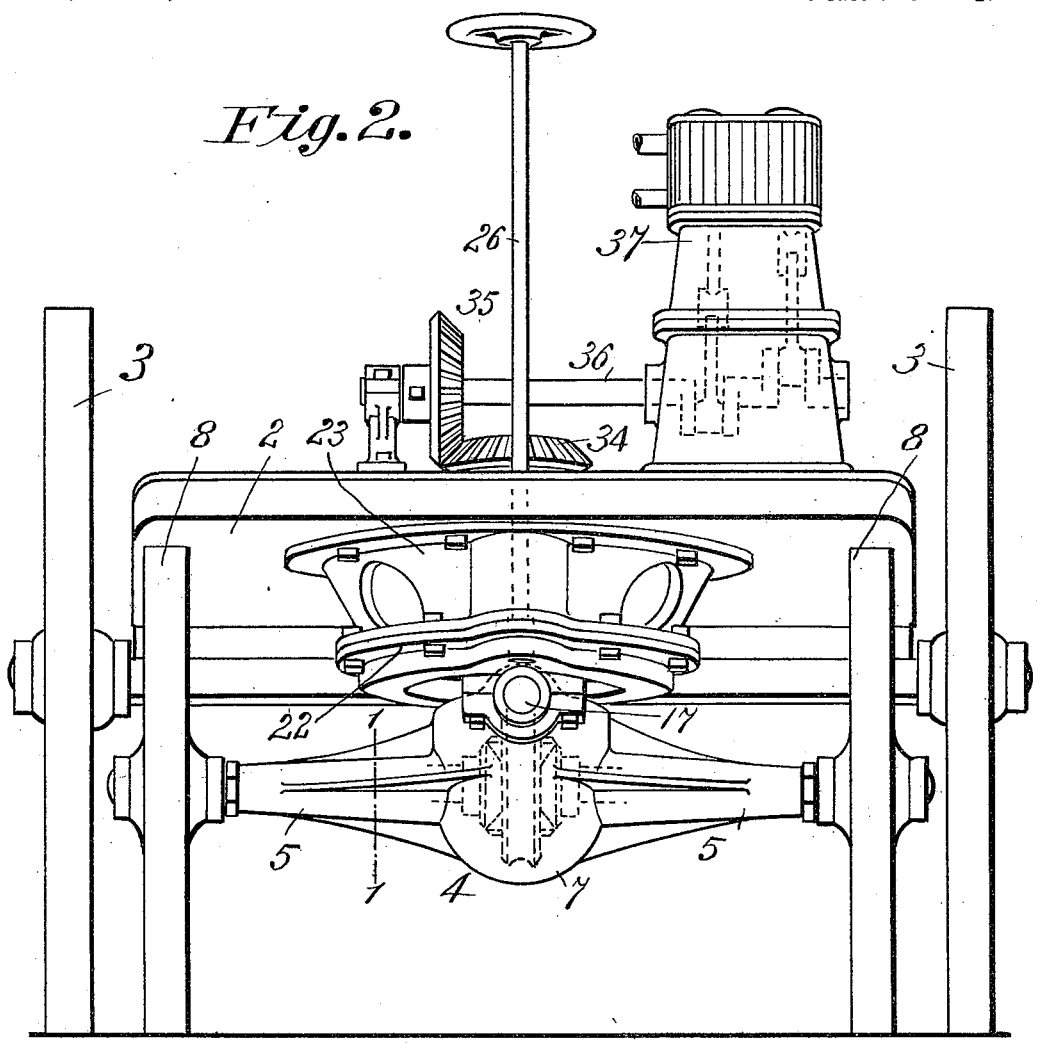
Figure 3:
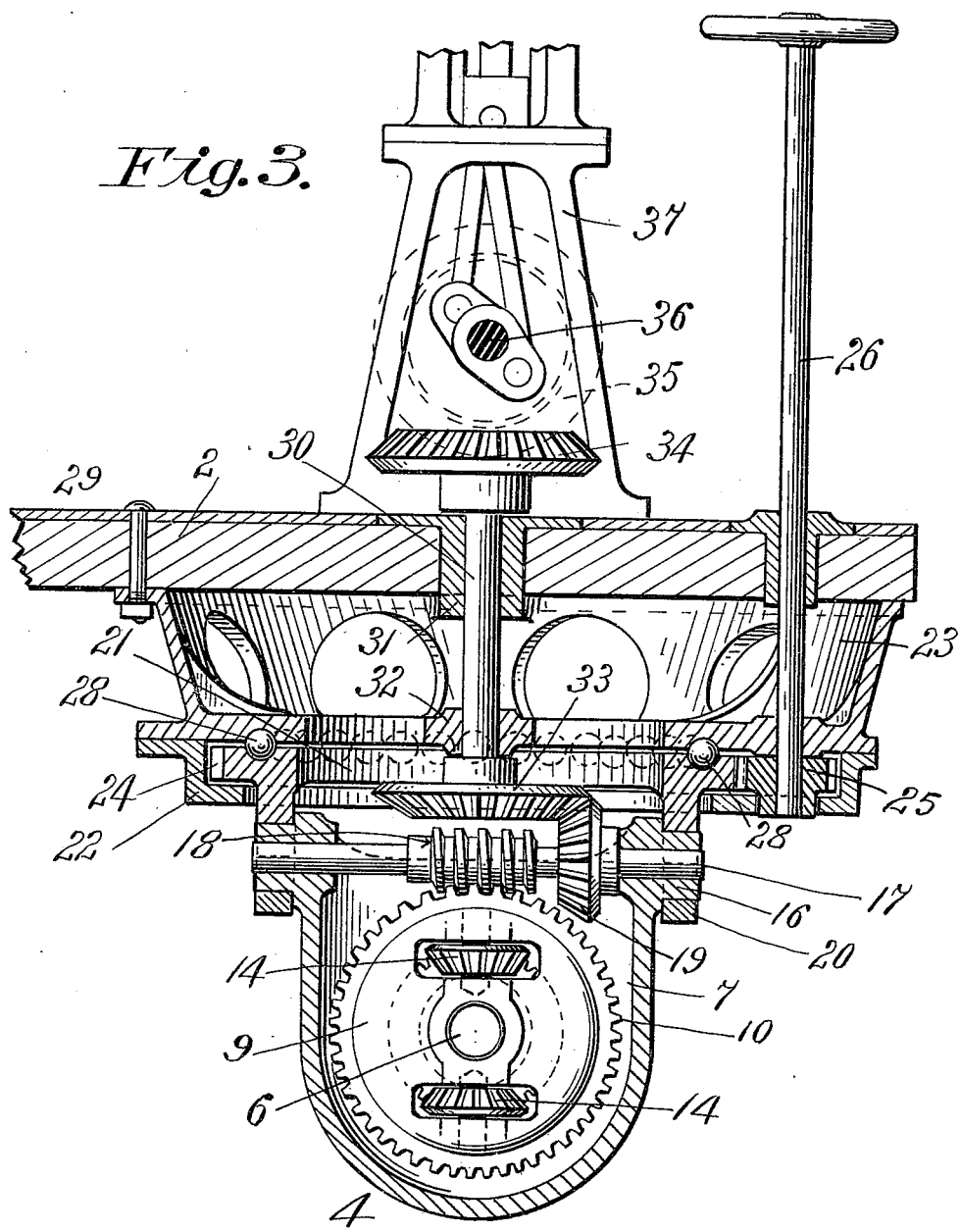

In the drawings forming part of this specification, Figure 1 is a side elevation of a truck embodying this invention. Fig. 2 is a front elevation of the same. Fig. 3 is an enlarged longitudinal section of the forward portion of a truck. Fig. 4 is a section at right angles to that of Fig. 3, taken lengthwise through the front axle. Fig. 5 is a plan view of the casing inclosing and supporting the front axle and a part of the driving mechanism.

Referring to the drawings, Figs. 1 and 2 show a motor of the type commonly employed when air, steam, or other vapor is used as a motive force; but this forms no part of the invention, as any type of motor may be employed to give the proper movement to the driving-axle of the vehicle.

Whatever the type of motor may be, suitable provision may be made for supplying thereto the necessary motive force.

The body 2 of the truck may be made in any required shape and of any suitable material, and is provided on one end thereof with an axle and wheels 3 of the ordinary construction. The opposite end of the truck is supplied with a driving-axle, whose construction is shown in detail in Fig. 4 and which comprises a casing 4, of metal, preferably malleable iron, and consists of two tubular arms 5, in which the axle 6, made in two parts, is suitably supported where it enters and emerges from said arms. The latter are made integral, preferably with a hollow cup-shaped center portion 7, which incloses the driving connection between the axle 6 and the motor.

Wheels 8 are fixed to the outer ends of the axle 6 by being keyed thereon or in any other suitable way whereby they will be made to rotate with said axle. The inner ends of the axle are located end to end in the center of a disk 9, bored out to receive them, and to the periphery of said disk is secured in any convenient manner the worm-gear 10.

Differential-gear connections for the two portions of the axle 6 are provided, and consist of bevel-gears 12 and 13, secured, respectively, to the two parts of the axle, close to the disk 9, and intermediate gears 14, located in slots in the disk 9 on pins 15, passing transversely through said slots and radial to said disk. These differential gears are such as are commonly applied in constructions similar to this for the well-known purpose of allowing one wheel on an axle to move at a rate of speed different to the other. In the upper edge of said cup-shaped portion 7 of the casing are two oppositely-located bearings 16, the center line of which is at right angles to the axle 6 and central relative to the ends of said axle, and in these bearings is a shaft 17, on which is a worm 18, which is in mesh with the worm-gear 10, and on the shaft 17 is secured a bevel-gear 19. The ends of the bearings 16 are turned down, as shown in Fig. 3, and enter suitable bearings 20, depending from a ring 21, which is adapted to rotate freely in a horizontal plane in a suitable casing 22, bolted to the lower edge of an annular support 23, which in turn is bolted to the under side of the body of the wagon. Said ring 21 is, in effect, a turn-table, on which the driving-axle is pivotally supported and adapted to swing in a horizontal plane with the ring or turn-table and to have an oscillatory movement in a vertical plane independently of said ring. The said ring 21 is made with a horizontally-extending edge, which enters a circular groove in the casing 22, and the outer edge of the said ring lying in the said casing 22 is provided with gear-teeth 24. At any convenient point on the circumference of this casing an opening therethrough is made, whereby a suitably-supported pinion 25 may engage with said teeth 24 for the purpose of rotating the ring 21 as may be desired by the manipulation of a suitably-supported shaft 26, to which said pinion 25 is secured. The said annular support 23 is provided with an inwardly-projecting flange 27, which extends over the ring 21 and forms the top of the groove in which said ring rotates, and between said ring and said flange 27 a series of hard-steel balls 28 are located in suitable concentric grooves, on which balls the weight of one end of the truck rests, together with whatever load may be on that part thereof. Some means of this description are desirable to permit the easy turning of the ring 21 when the truck is heavily loaded, and, if desired, other means than said balls may be used—such as rolls, for instance.

The bolts which secure the support 23 to the truck-body may serve to secure a plate 29 to the surface thereof, which plate serves as a base to which the parts of the construction lying on that part of the truck may be secured, whereby different parts of the whole structure may be maintained in their proper relations.

A shaft 30, located at right angles to the worm-shaft 17, is supported in bearings in two arms 31 32, cast integral with the support 23 and located transversely of said support, approximately in the plane of the top and bottom edges thereof. These arms show only in section in Fig. 3 and the lower one only in Fig. 4. On the lower and upper extremities of this shaft 30 are fixed two bevel-gears 33 and 34, the one, 33, in mesh with the gear 19 on the shaft 17 and the other in mesh with a bevel-gear 35 on the crank-shaft 36 of a motor 37. Thus the movements of the crank-shaft 36 of said motor will through the bevel-gears 34 and 33 and 19 impart rotary movements to the worm-shaft 17 and the latter to the worm-gear 10, which, through the differential-gear connections with the axle, drive the latter.

It will be observed that the axle, which is supported in its casing 4, may, with the latter, oscillate in a vertical plane on the shaft 17, which supports said casing, and that said shaft 17 is hung in bearings on a ring 21, which may be rotated freely in a horizontal plane, and that the movements of the said ring 21 are about the axis of the shaft 30 as a center, and therefore the driving connection between the said shaft and the shaft 17 must always remain in the same relation whatever may be the position of the axle 6 and its casing relative to either a vertical or a horizontal plane.

The shaft 17 may be made of such length and diameter as will adapt it to withstand the shock of any inequality of the road which the driving-wheels may encounter, for it is this shaft which first receives such a shock—for instance, as would result from the wheel running into a hole in the pavement—which shock will then be transmitted to the ring 21 and to the supports therefor.

No distinction has been made herein between the front and rear ends of the truck, for either end thereof may be the front or rear, as the vehicle can be operated with equal facility in either direction, though, generally speaking, that end thereof having the motor thereon would for obvious reasons in handling the vehicle be the front end thereof.

A great advantage residing in this invention consists in the connection between the motor and the axle through the worm and gear, whereby the rotation of the axle is absolutely controlled when the vehicle is descending a grade, it being manifestly impossible for the vehicle to move faster than the rotation of the wheels will permit and that may be controlled by the revolutions of the motor. Thus it is seen that no brake is needed on the vehicle and that it is always under control either in descending a grade or, if it is stopped for any reason, when ascending a grade.

Having thus described my invention, what I claim, and desire to secure by Letters Patent of the United States, is—

1. In a self-propelled vehicle, a motor, a driving and steering axle adapted to swing in a horizontal plane, and whose ends are adapted to oscillate in a vertical plane, an axle-driving member located on the axis of oscillation of said axle, engaging the latter and connected with said motor, the axis of said driving member passing through the axis of oscillation of the axle, normally at right angles to the latter, whereby rotary movements may be imparted to said axle during the oscillations thereof, substantially as described.

2. In a self-propelled vehicle, a motor, a driving and steering axle whose ends are adapted to oscillate in a vertical plane, a driving member located on the axis of oscillation of said axle, engaging the latter and connected with said motor, the axis of said driving member passing through the axis of oscillation of the axle, normally at right angles to the latter, whereby rotary movements may be imparted to said axle during the oscillations thereof, an annular member adapted to rotate in a fixed horizontal plane on which said driving member is supported, and means for rotating said annular member, substantially as described.

3. In a self-propelled vehicle, a member supported thereon for rotary movements about a fixed point, and means for rotating said member, a driving and steering axle supported on said member, a motor, a rotatable driving connection for said axle supported on said member transversely thereof and rotatable in a horizontal plane therewith, and means located on the axis of rotation of said member for imparting rotary movements to said driving connection, substantially as described.

4. In a self-propelled vehicle, a member supported thereon for rotation about a fixed center, a driving and steering axle, hung on said member, whose extremities are adapted to move independently thereof in vertical planes, and to move therewith in a horizontal plane, a motor, and suitable connections between said motor and axle for rotating the latter, substantially as described.

5. In a self-propelled vehicle, a member supported thereon for rotation about a fixed center, a driving and steering axle hung on said member, said axle consisting of two parts united, by differential gear connections, to rotate as one piece and adapted to move independently of said member in vertical planes, and with said member in a horizontal plane; a motor, and suitable connections between said motor and the driving member of said differential gears, whereby said axle may be rotated, substantially as described.

6. In a self-propelled vehicle, a rotatable member supported thereon for rotation about a fixed point, a driving-shaft supported on said member and located normally on the longitudinally-central line of the vehicle, a driving and steering axle supported in a casing, bearings in said casing for said driving-shaft, whereby said axle is supported on said rotatable member; a worm on said driving-shaft, a worm-gear on said axle engaging therewith, and a shaft located centrally of said rotatable member and at right angles to said driving-shaft, and connected with the latter by bevel-gears, for rotating said axle, substantially as described.

7. In combination with a suitable motor, a driving and steering axle for a self-propelling vehicle, comprising a rotatable member supported on the vehicle, an axle pivotally supported on said member, a shaft axially located relative to said pivotal supports, and also constituting the driving member of said axle, and suitable connections between the axle and said driving-shaft, and the latter and said motor, substantially as described.

8. In a self-propelled vehicle, a horizontally-rotatable turn-table, an axle pivotally supported on said turn-table and adapted to swing in a vertical plane relative thereto, a gear on said axle, a driving-shaft concentric with the pivotal supports of said axle, a driving connection between said shaft and said gear, and means for rotating said shaft, substantially as described.

9. A turn-table mounted on a vehicle-body for rotation in a horizontal plane, a pivotally-supported axle on said turn-table, adapted to swing thereon in a vertical plane, a gear on said axle, a shaft located on the axis of vertical oscillation of said axle, a worm on said shaft engaging said gear, and means for rotating said shaft, substantially as described.

JAMES H. BULLARD.

Witnesses:
WM. H. CHAPIN,
K. I. CLEMONS.